United States Patent [19]
Balwe et al.

[11] 3,817,959
[45] June 18, 1974

[54] PROCESS FOR SUSPENSION POLYMERIZATION OF VINYL CHLORIDE WITH LOW POLYMER DEPOSITION

[75] Inventors: Thomas Balwé; Johann Bauer; Kurt Fendel; Dieter Kurz; Alex Sabel, all of Burghausen, Germany

[73] Assignee: Wacker Chemie GmbH, Munich, Germany

[22] Filed: Feb. 22, 1973

[21] Appl. No.: 334,693

[30] Foreign Application Priority Data
May 24, 1972 Germany............................ 2225236

[52] U.S. Cl..... 260/87.1, 260/78.5 R, 260/78.5 CL, 260/80.78, 260/85.5 XA, 260/85.5 L, 260/85.5 N, 260/86.3, 260/87.5 R, 260/87.5 A, 260/87.5 C, 260/87.7, 260/92.8 W
[51] Int. Cl....... C08f 3/30, C08f 15/02, C08f 15/30
[58] Field of Search............. 260/92.8 W, 87.5, 87.1

[56] References Cited
UNITED STATES PATENTS

| | | | |
|---|---|---|---|
| 3,418,300 | 12/1968 | Nakajima et al............. | 260/92.8 W |
| 3,691,080 | 9/1972 | Bauer et al.................... | 260/92.8 W |
| 3,719,651 | 3/1973 | Greminger et al............ | 260/92.8 W |
| 3,720,700 | 3/1973 | Norback....................... | 260/92.8 W |

*Primary Examiner*—Harry Wong, Jr.
*Attorney, Agent, or Firm*—Hammond & Littell

[57] ABSTRACT

An improvement in the suspension polymerization of a polymerizate containing at least 80% of polyvinyl chloride with low polymer deposits by the steps of mixing (1) monomers selected from the group consisting of vinyl chloride and mixtures of vinyl chloride with up to 20% by weight of olefinically monounsaturated compounds copolymerizable with vinyl chloride, (2) an oil-soluble free-radical forming polymerization catalyst, (3) suspension stabilizers including protective colloids, and (4) water, heating said mixture under agitation to polymerization temperatures and recovering said polymerizate, the improvement comprises using from 0.001% to 1% by weight, based on the monomers, of an unbranched dialkylperoxy dicarbonate having 16 to 18 carbon atoms in the alkyl, as the oil-soluble free-radical-forming polymerization catalyst, and adding from 0.0001% to 0.01% by weight, based on the monomers, of a water-soluble salt of nitrous acid to the polymerization charge, whereby a polymerizate is recovered with low polymer deposits.

9 Claims, No Drawings

PROCESS FOR SUSPENSION POLYMERIZATION OF VINYL CHLORIDE WITH LOW POLYMER DEPOSITION

THE PRIOR ART

In the production of polyvinyl chloride by suspension polymerization, the inner wall of the polymerization autoclave is generally incrustated more or less with polymer, regardless of the finish of the inner wall. These incrustations, films or other deposits must normally be removed after each change in the large-scale production of PVC in order to permit an unhindered elimination of the reaction heat. If the polymer deposits are not removed, the cooling capacity of the autoclave is reduced and uneconomical long reaction times are the result.

For cleaning the autoclave, a man must usually enter the autoclave under corresponding protective measures in order to scrape off the wall with a spatula. This cumbersome measure reduces the economical usefulness of the autoclave because of the great time consumption involved in its cleaning. Particularly problematic is the spatula-cleaning in autoclaves with specially prepared surfaces, such as polished or enamelled inner walls. Here damages caused by the entering and scraping are unavoidable, as experience has shown, so that the high-grade finishes of the inner walls of the autoclaves are destroyed this way.

Furthermore spraying devices are frequently used where a water jet is used for cleaning under high pressure. These devices can only be used successfully, however, in the case of light incrustations. Complete cleaning is frequently not possible this way. Beyond that, the time gained, compared to spatula cleaning, is in most cases insignificant. In addition, the handling of high pressure cleaning apparatus involves a high accident risk.

In new autoclaves with polished or enamelled inner walls it was found that only a light coat is formed at first. But this effect is lost after a certain operating time, for reasons which are not exactly known, so that here too spatula cleaning is unavoidable.

OBJECTS OF THE INVENTION

An object of the present invention is the development of improved processes for the suspension polymerization of vinyl chlorides where the polymer deposits are substantially eliminated thus enabling repeated polymerizations in the reactor without necessity for its cleaning after each polymerization.

Another object of the present invention is the development, in the suspension polymerization process for the production of polymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically mono-unsaturated compounds copolymerizable with vinyl chloride, (2) an oil-soluble free-radical-forming polymerization catalyst, (3) suspension stabilizers including protective colloids, and (4) water, heating said mixture under agitation to a polymerization temperature of between 0°C and 80°C, and recovering said polymerizate, of the improvement which consists in using from 0.001% to 1% by weight, based on the monomers, of an unbranched dialkylperoxy dicarbonate having 16 to 18 carbon atoms in the alkyl, as said oil-soluble free-radical-forming polymerization catalyst, and adding from 0.0001% to 0.01% by weight, based on the monomers, of a water-soluble salt of nitrous acid to the polymerization charge, whereby a polymerizate is recovered with low polymer deposits.

These and other objects of the invention will become more apparent as the description thereof proceeds.

DESCRIPTION OF THE INVENTION

This invention is based on the problem of reducing the wall deposits of polymers in the suspension polymerization of vinyl chloride, if necessary, together with a comonomer, in conventional factory autoclaves to such an extent that a repeated sequence of charges can be run without spatula-cleaning of the autoclave.

The subject of the invention is a method for the polymerization of vinyl chloride or the copolymerization of vinyl chloride with up to 20% additional mono-olefin-unsaturated monomers in the aqueous phase in the presence of oil-soluble radical-formers, dispersing agents and, if necessary, other polymerization aids, characterized in that unbranched dialkylperoxy dicarbonates having alkyl radicals with 16 to 18 carbon atoms are used as oil-soluble radical-formers in quantities of 0.001% to 1.0% by weight, preferably 0.05% to 0.5% by weight, based on the monomer, and that 0.0001% to 0.01% by weight, based on the monomer, of one or several water-soluble salts of nitrous acid are added to the polymerization charge.

More particularly, the invention relates to an improvement in the suspension polymerization process for the production of polymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically mono-unsaturated compounds copolymerizable with vinyl chloride, (2) an oil-soluble free-radical-forming polymerization catalyst, (3) suspension stabilizers including protective colloids, and (4) water, heating said mixture under agitation to a polymerization temperature of between 0°C and 80°C, and recovering said polymerizate, the improvement which consists in using from 0.001% to 1% by weight, based on the monomers, of an unbranched dialkylperoxy dicarbonate having 16 to 18 carbon atoms in the alkyl, as said oil-soluble free-radical-forming polymerization catalyst, and adding from 0.0001% to 0.01% by weight, based on the monomers, of a water-soluble salt of nitrous acid to the polymerization charge, whereby a polymerizate is recovered with low polymer deposits.

In the polymerization method according to the invention, th formation of crusts or polymer deposits on the autoclave wall is surprisingly prevented to such an extent that a number of polymerization charges can be run without mechanical spatula cleaning, both in small test autoclaves and in large factory autoclaves. Even in older autoclaves whose walls had been greatly damaged by frequent spatula cleaning, incrustation is prevented to a considerable extent. The method according to the invention can be used with great advantage in autoclaves with polished, enamelled or otherwise specially treated, hence easily-damaged inner walls. In autoclaves of this type, mechanical spatula-cleaning can mostly be completely foregone, since the adhesion of the light polymer deposits formed after a number of successive charges, is so low that cleaning with a water sprayer alone is usually completely sufficient. Entering the autoclave for spatula cleaning is thus not necessary, so that an economical use of the autoclave is ensured.

The use of nitrites in the free-radical polymerization of unsaturated monomers as a regulator or to improve the bulk densities of the polymers is known, but the teaching that the use of a catalyst-combination of dialkylperoxy dicarbonates with unbranched alkyl groups having 16 to 18 carbon atoms and nitrites effects an almost complete elimination of the incrustation of autoclaves in the suspension polymerization of vinyl chloride is completely novel and not taught by the prior art.

Preferably dicetylperoxy dicarbonates are used together with sodium nitrite. Naturally any other water-soluble nitrites, for example, alkali metal nitrites and alkaline earth nitrites, as well as ammonium nitrite, such as potassium nitrite and ammonium nitrite, can also be used. The catalyst system can be charged at the onset or added partly during the polymerization.

The polymerization is carried out according to the known methods of suspension polymerization at temperatures of between 0° C and 80° C, preferably from 30° C to 80° C, and pressures frequently between 1 and 15 atmospheres. Mostly the polymerization is effected at the autogenous pressure of the monomers.

Mainly cooled autoclaves are used having cooled or jacketed shells and, possibly, also cooled or jacketed covers. These autoclaves usually are supplied with stirring devices, baffle plates and flow disturbers and are optionally equipped with any required dosing devices. The attachment of a reflux condenser is also possible.

The dispersing agents or suspension stabilizers including protective colloids are those generally used in suspension polymerization. Protective colloids or dispersing agents ordinarily employed are, for example, polyvinyl alcohol, which can contain up to 40 mol percent of acetyl groups, gelatin, polyvinylpyrrolidone, preferably cellulose ethers of the water-soluble type, such as methyl cellulose, hydroxyethyl cellulose, methylhydroxyethyl cellulose, hydroxypropyl cellulose, methylhydroxypropyl cellulose, carboxyl-methyl cellulose, as well as water-soluble salts of copolymers of maleic acid or its half esters with styrene, ethylene or vinyl esters, mixtures of these protective colloids as well as protective colloid-emulsifier combinations. Amounts of 0.03% to 1.5% by weight, based on the water content, are used. The necessary amounts can be charged at the beginning or added in doses.

Furthermore it is possible within the framework of the claimed method to use the additives generally employed in the suspension polymerization of vinyl chloride, such as particle size regulators, for example, inorganic salts, such as sodium chloride or calcium chloride; buffer salts, such as sodium bicarbonate, sodium carbonate, calcium carbonate, alkali metal phosphates, such as secondary potassium phosphate; molecular weight regulators, such as aliphatic aldehydes or alkanals, chlorinated hydrocarbons, such as di- and trichloroethylene, chloroform, mercaptans, propylene, isobutylene and cyclohexene. The pH value of the aqueous phase is mostly maintained at 3 to 8, preferably 3.5 to 7.

The quantitative ratio of water to the total amount of the monomer is not a determinant factor. The portion of the monomer in the total amount of water and monomer is mostly 10% to 60% by weight, preferably 20% to 50% by weight. Water can also be added during the polymerization. Furthermore it is possible to add up to 50% by weight of water-soluble organic solvents to the aqueous phase, for example, water-soluble alkanols such as methanol and ethanol.

Examples of olefinically mono-unsaturated compounds copolymerizable with vinyl chloride which can be used as comonomers are particularly vinyl esters of alkanoic acids with 1 to 20 carbon atoms, preferably vinyl acetate. Other vinyl esters which can be used are: vinyl propionate, vinyl butyrate, vinyl 2-ethylhexaonate, vinyl laurate, vinyl esters of α-branched alkanoic acids having 8 to 24 carbon atoms, such as "Versatic acids," vinyl esters of isotridecanoic acid (an isomer mixture of highly branched compounds, which contains primarily tetramethyl nonanoic acid); vinyl halides, for example, vinyl fluoride, vinylidene fluoride, vinylidene chloride; unsaturated carboxylic acids and their mono- or diesters with alkanols with 1 to 18 carbon atoms, such as acrylic acid, methacrylic acid, fumaric acid, maleic acid, and itaconic acid, such as 2-methylhexyl, acrylate, methyl methacrylate, maleic acid di- or mono-2-ethylhexyl ester, dioctyl fumarate; vinyl ethers; olefins, such as ethylene, propylene, butylene, 2-methyl-pentene-1; styrene; allyl compounds and acrylo nitrile. Mixtures of the monomers can also be used. Both the comonomers and the vinyl chloride can be added during the polymerization. When ethylene and propylene are used, up to 100 atmospheres are necessary in some cases.

The polymerizates produced can be utilized in all forms of utilizations previously employed for suspension polymerized vinyl chlorides.

The following examples are illustrative of the invention without being limitative in any manner.

EXAMPLE 1

COMPARISON EXAMPLE

A V2A-steel autoclave of 2 m$^3$ capacity with stirrer was utilized, whose wall showed marked traces of use, such as scratches and nicks as a result of frequent spatula cleaning. 850 gm of partially saponified medium-viscous polyvinyl alcohol (hydrolysis degree = 70 mol percent) as well as 85 gm of sodium bicarbonate were dissolved therein under stirring in 930 kg of fully deionized water. After adding 285 gm of dicetylperoxy dicarbonate, the air was removed from the closed autoclave in a known manner. Then 570 kg of vinyl chloride were added under stirring (130 rpm). The reaction mixture was heated to 54° C. After about 9 hours the pressure began to drop. As soon as the pressure drop had reached 1.5 atm., the polymerization was terminated by cooling and distilling off the unused vinyl chloride. The monomer conversion under the selected conditions was 85%. The pH value of the aqueous phase was 7.0.

With the above-mentioned polymerization recipe it was possible to run six charges in succession without spatula-cleaning. After each charge it was merely necessary to rinse off the adhering PVC with water. Spatula-cleaning of the autoclave wall and stirrer after six charges gave a polymer crust of 3.0 kg of dry substances.

EXAMPLE 2

The foregoing comparison example was repeated with the change that an additional 28 gm of sodium nitrite were added to the aqueous phase. Under otherwise equal conditions, 12 successive charges could be run. Spatula-cleaning after 12 charges yielded 2.8 kg of polymer crust.

EXAMPLE 3

Example 2 was repeated with the charge that 285 gm of a mixture of equal parts of primary and secondary sodium phosphate were used as a buffer instead of sodium bicarbonate. After six successive charges the wall deposit weighed 15 gm. The pH value of the aqueous phase was between 5.5 and 6.5.

EXAMPLE 4

Example 1 was repeated without buffer addition with 5.6 gm of sodium nitrite and 342 gm of dicetylperoxy dicarbonate. After six successive charges, practically no deposit was observed on the autoclave wall. The pH value of the aqueous phase was between 3.5 and 4.0.

EXAMPLE 5

A stirring autoclave of 32 m$^3$ capacity with a polished steel V2A wall was filled in known manner with 10.8 parts by weight of vinyl chloride, 18.0 parts by weight of fully deionized water, 0.2 parts by weight of a 4% aqueous medium-viscous methyl cellulose solution, and 0.05% by weight of dicetylperoxy dicarbonate and 0.0037% by weight of sodium nitrite (percent by weight data was based on the monomer content). The polymerization temperature was 53° C; the reaction time was 8.5 hours. Without mechanical cleaning (only cleaning with the sprayer), 25 successive charges could be run without impairing the quality of the product, a PVC without any fisheyes and with a K-value of 70 was obtained and it was still not necessary to stop the succession of charges for spatula-cleaning.

COMPARISON

Under equal test conditions, but without the addition of sodium nitrite, mechanical spatula-cleaning was necessary after five polymerization charges.

EXAMPLE 6

Into a stirring autoclave of 400-liter capacity were charged:

200 parts of fully deionized water
0.5 parts of polyvinyl alcohol with a saponifica-number of 270
0.05 parts of calcium carbonate
0.09 parts of di-stearylperoxy dicarbonate pH of the water phase was 4.5.

The autoclave was then evacuated and charged with:

10 parts of vinyl acetate
90 parts of vinyl chloride.

The entire contents of the autoclave was subsequently heated under stirring to a temperature of 56° C. The polymerization commenced and was completed after 10 hours with a conversion of about 95%. Then the unreacted monomers were removed by distillation and the aqueous suspension of copolymerizate was drawn off through the bottom valve. The loosely adhering polymer was removed from the autoclave by spraying with water. Then the bottom valve was closed and the autoclave was charged as above for a new polymerization. Altogether five charges were run in succession, and the wall of the autoclave was freed of the loosely adhering product between the various charges simply by spraying with water. After the five charges were completed, the autoclave was cleaned thoroughly. A total of 1.8 kg of polymer deposit was removed from the autoclave wall, stirrer and a splashboard by scraping with metal spatulas.

COMPARISON CHARGE

Proceeding as above, but with 50 ppm of sodium nitrite (related to water) being added in each charge, after the water had been charged, the polymerizations were again effected. After five successive polymerizations, the autoclave was thoroughly cleaned. 0.9 kg of polymer were removed from the wall, stirrer and splashboard with metal spatulas.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. In the suspension polymerization process for the production of polymerizates selected from the group consisting of polyvinyl chloride and copolymerizates containing at least 80% of polyvinyl chloride, with low polymer deposits, which comprises the steps of mixing (1) monomers selected from the group consisting of vinyl chloride and mixtures of vinyl chloride with up to 20% by weight of olefinically mono-unsaturated compounds copolymerizable with vinyl chloride, (2) an oil-soluble free-radical-forming polymerization catalyst, (3) suspension stabilizers including protective colloids, and (4) water, heating said mixture under agitation to a polymerization temperature of between 0° C and 80° C, and recovering said polymerizate, the improvement which consists in using from 0.001% to 1% by weight, based on the monomers, of an unbranched dialkyl-peroxy dicarbonate having 16 to 18 carbon atoms in the alkyl, as said oil-soluble free-radical-forming polymerization catalyst, and adding from 0.0001% to 0.01% by weight, based on the monomers, of a water-soluble salt of nitrous acid to the polymerization charge, whereby a polymerizate is recovered with low polymer deposits.

2. The process of claim 1 wherein from 0.05% to 0.5% by weight, based on the monomers, of said dialkylperoxy dicarbonate is employed.

3. The process of claim 1 wherein said water-soluble salt of nitrous acid is an alkali metal nitrite.

4. The process of claim 1 wherein said dialkylperoxy dicarbonate is dicetylperoxy dicarbonate and said water-soluble salt of nitrous acid is sodium nitrite.

5. The process of claim 1 wherein said suspension stabilizers including protective colloids is a water-soluble cellulose ether.

6. The process of claim 1 wherein said olefinically mono-unsaturated compound copolymerizable with vinyl chloride is vinyl acetate.

7. The process of claim 1 wherein the aqueous phase is adjusted to a pH of 3 to 8.

8. The process of claim 7 wherein the aqueous phase is adjusted to a pH of 3.5 to 7.

9. The process of claim 1 wherein said dialkylperoxydicarbonate is distearylperoxydicarbonate.

* * * * *